W. H. TROUT.
BAND MILL.
APPLICATION FILED MAY 31, 1917.

1,374,967.

Patented Apr. 19, 1921.
3 SHEETS—SHEET 1.

W. H. TROUT.
BAND MILL.
APPLICATION FILED MAY 31, 1917.

1,374,967.

Patented Apr. 19, 1921.
3 SHEETS—SHEET 3.

Inventor
W. H. Trout
by
Attorney

UNITED STATES PATENT OFFICE.

WILLIAM HENRY TROUT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BAND-MILL.

1,374,967.  Specification of Letters Patent.  Patented Apr. 19, 1921.

Application filed May 31, 1917. Serial No. 172,092.

*To all whom it may concern:*

Be it known that I, WILLIAM HENRY TROUT, a citizen of the United States, residing at Milwaukee, in the county of Milwaukee and State of Wisconsin, have invented a certain new and useful Improvement in Band-Mills, of which the following is a specification.

This invention relates to improvements in the construction of saw mill machinery and has particular relation to improvements in the construction of band saw mills.

An object of the invention is to provide a band saw mill which is simple and rigid in construction and efficient in operation.

One of the more specific objects is to provide a band saw mill which is adapted for use either as a single or as a double cutting mill. This result is accomplished by providing double upper and lower band wheels in which the width of the faces may be adjusted to accommodate saws of different widths.

Another specific object is to provide a rigid and compact structure which will produce boards of uniform thickness. This result is accomplished by providing a double vertically adjustable guide arm for holding the upper saw guide in position at both the leading and the trailing edges of the saw. The double guide arm besides serving as a support for the main side frames, eliminates the tendency of double cutting saws to alternately produce boards of different thicknesses.

A further specific object is to provide simple and efficient means for balancing the weight of and for adjusting the supporting arm of the upper guide. This result is accomplished by providing parallel supports for the guide arm, along which supports the arm is adjustable by means of a manually controlled balance weight connected to corresponding ends of a pair of levers pivoted to the mill frame and having their opposite ends connected to the guide arm.

Still another specific object is to provide simple, efficient and rapidly operable means for varying the tension in the saw, for adjusting the upper band wheel to permit removal or insertion of a saw, and for adjusting the upper band wheel to accommodate different lengths of saws. These results are accomplished without the use of the relatively slow-acting screw mechanisms of the prior art, by providing a horizontal tension lever and an adjustable weight movable along this lever. When removing the saw, the weight may be shifted to a position where the forces exerted upon the lever by the upper wheel and the adjustable weight, balance each other, when the lever may be swung into an approximately vertical position, thereby lowering the upper wheel sufficiently to permit removal of the saw. The distance between the band wheels may be readily varied by means of a hand wheel and gearing, to accommodate saws of different lengths.

Another specific object is to provide a simple and efficient saw guide wherein the guide blocks may be readily adjusted to compensate for wear and in which the guiding surfaces may be brought as near as possible to the work or log being sawed.

A clear conception of an embodiment of the several features of the invention may be had by referring to the drawings accompanying and forming a part of this specification in which like reference characters designate the same or similar parts in the various views.

Figure 1:
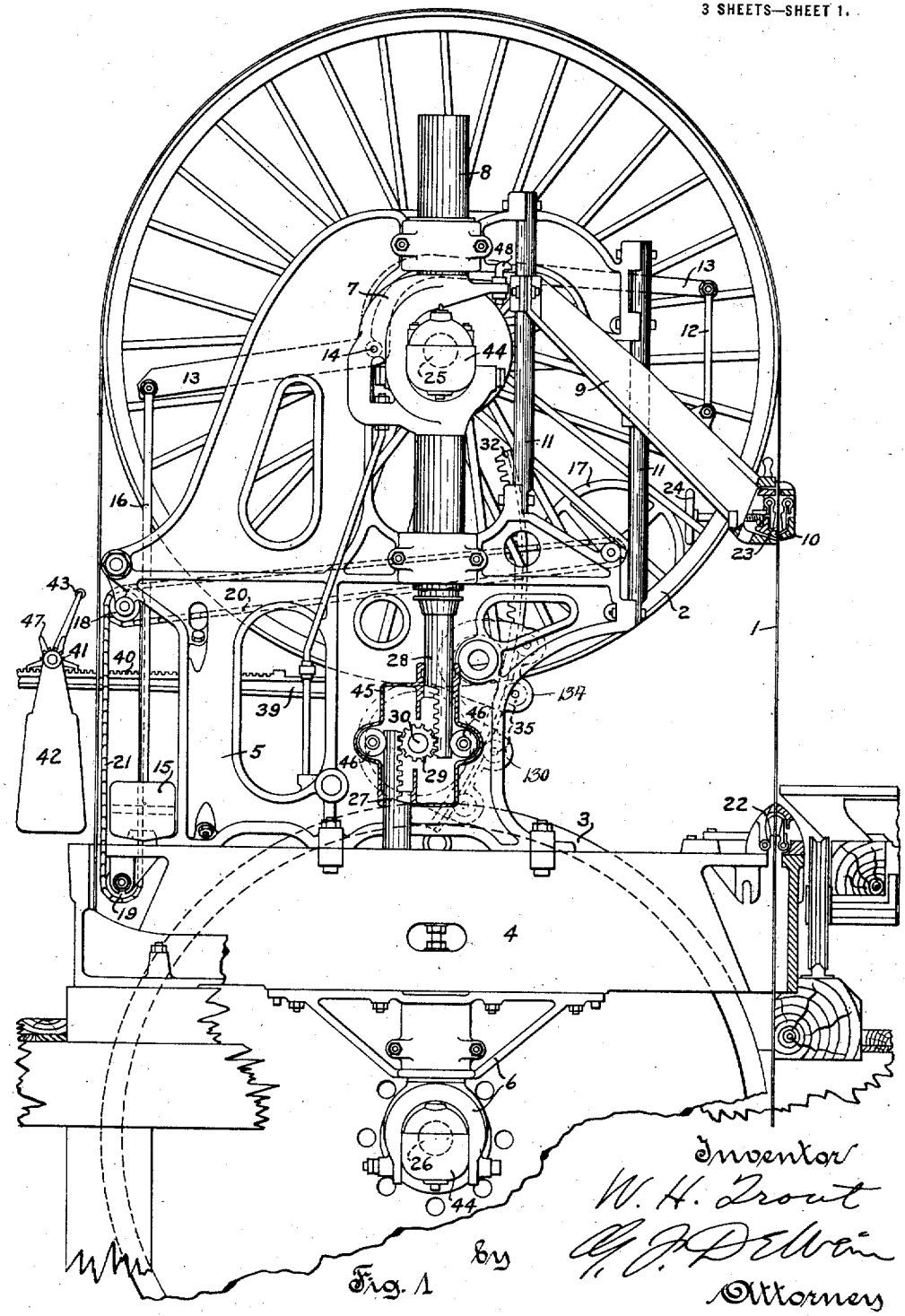
Figure 1 is a fragmentary part-sectional side elevation of a band saw mill.
Figure 2:
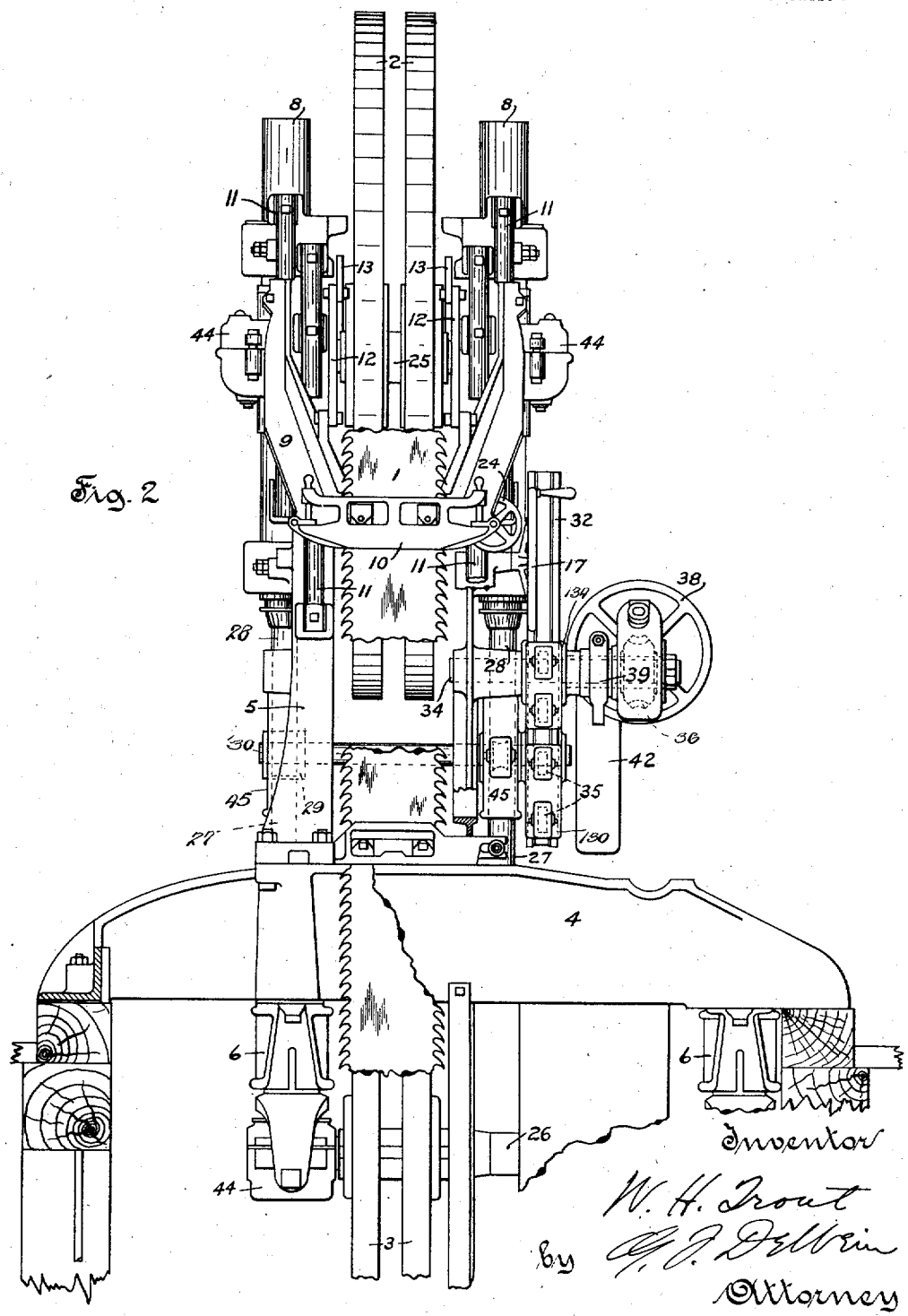
Fig. 2 is a fragmentary part-sectional front elevation of a band saw mill.
Figure 3:
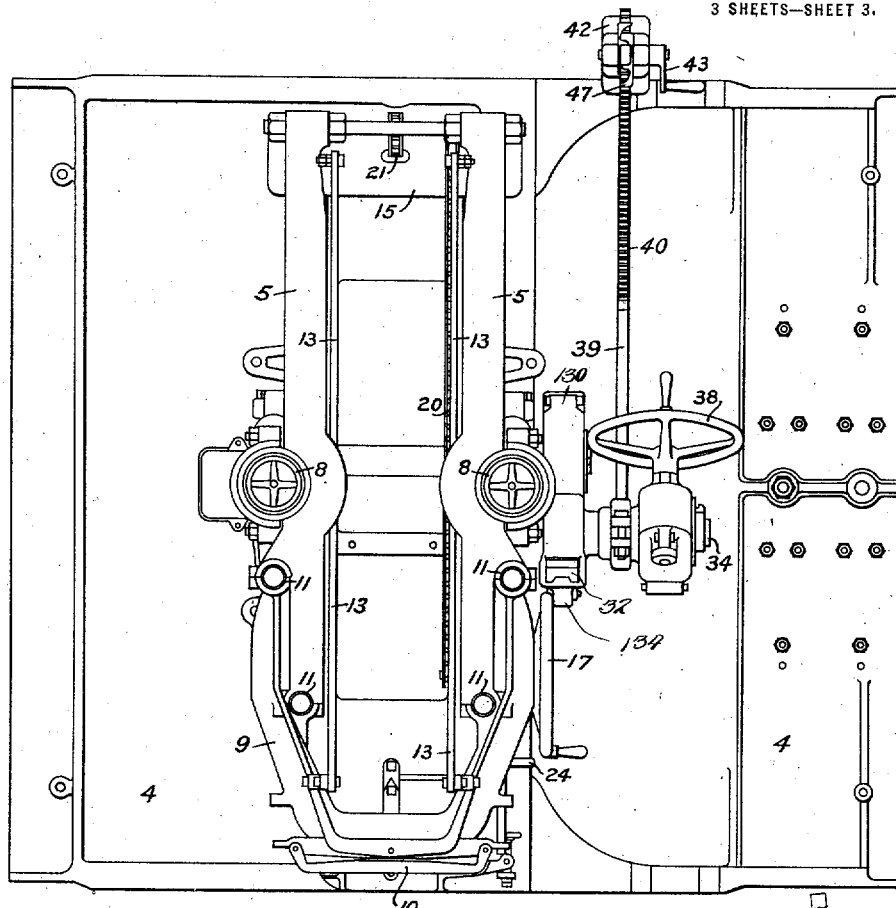
Fig. 3 is a top view of a band saw mill, the saw and band wheels being omitted.

Referring to the drawings, the band saw mill comprises an upper double band wheel 2, a lower double band wheel 3 and a double cutting continuous band saw 1 engaging these wheels. The upper wheel 2 comprises a pair of relatively movable wheels adjustably secured to the upper wheel shaft 25. The lower band wheel 3 comprises a pair of relatively movable wheels adjustably secured to the lower wheel shaft 26, this shaft being rotatable in the usual manner by any suitable means. The upper and lower wheel shaft 25, 26 are mounted in bearing boxes 44 of similar construction. The upper bearing boxes 44 are adjustably supported in brackets 7 secured to columns 8 which are vertically adjustably supported in the main side frames 5. The lower bearing boxes 44 are adjustably supported by brackets 6 secured to the bed plate 4.

Secured to the bed plate 4 on opposite sides of the wheel 3 are fixed racks 27 engaging pinions 29 secured to a pinion shaft 30. The pinion shaft 30 is mounted in bearings in the casings 45 slidably mounted upon the fixed racks 27. The lower extremities of the columns 8 are provided with integral racks 28 which also engage the pinions 29 and have sliding engagement with the casings 45. The casings 45 carry antifriction rollers 46 which engage the racks 27, 28 and prevent disengagement between the racks and the pinions 29.

Figure 5:
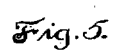
Fig. 5 is a diagram of the gearing for raising and lowering the upper band wheel.
Figure 4:
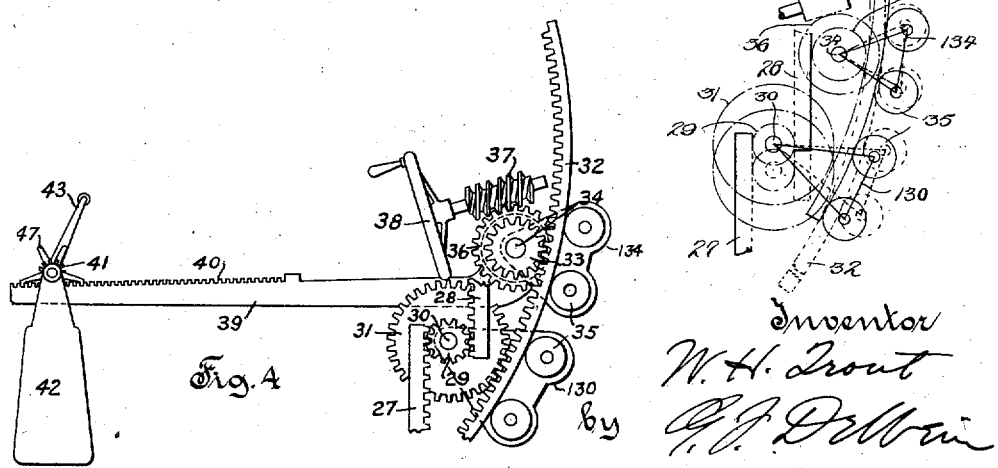
Fig. 4 is a fragmentary diagrammatic side elevation of the mechanism for lowering the upper band wheel and for tensioning the saw.

Referring specifically to Figs. 4 and 5, the pinion shaft 30 has secured thereto a spur gear 31 which engages the curved rack 32 supported by rollers 35 the lower two of which are mounted upon the swinging bracket 130 and the upper two of which are mounted in the swinging bracket 134. A spur gear 33 is rotatable about a fixed pivot shaft 34 mounted in the main frame 5, and engages the teeth of the curved rack 32. A lever 39 is journaled upon the pivot shaft 34 and has its outer end provided with a rack 40. The weight 42 is provided with a pinion 41 which engages the rack 40, this pinion being adjustable along the rack 40 by means of a crank 43. The weight may be locked in an adjusted position by means of manually operable locking elements 47. A worm wheel 36 secured to the spur gear 33, is also journaled upon the fixed shaft 34. The worm wheel 36 meshes with a worm 37 having a hand wheel 38 secured thereto. The worm 37 is rotatably mounted in a bracket secured to the lever 39. Upon rotating the hand wheel 38, the lever 39 will remain horizontal but the worm wheel 36 will be rotated about the axis of the shaft 34, causing the gear 33 to rotate and moving the rack 32 along the rollers 35, thereby causing the shaft 30 and pinions 29 to rotate and to move the columns 8.

The lower guide 22 is mounted upon the bed plate 4 and is provided with the usual quick-opening actuating mechanism. The upper guide 10 is mounted upon a U-shaped double guide arm 9 which is vertically adjustably supported upon parallel rods 11 supported by the side frames 5. The guide arm 9 is connected by means of connections 12 to corresponding ends of a pair of levers 13 located one on each side of the saw 1. The levers 13 have pivots 14 in the side frames 5 and have their opposite ends connected with a weight 15 by means of connections 16. The weight 15 is connected to one or more endless chains 21 which engage sprockets 18, 19. The upper sprocket or sprockets 18 are connected with a guide adjusting hand wheel 17 by means of a chain 20. The upper guide 10 completely surrounds the saw blade and is provided with guide blocks 23 which are pivoted at their upper ends to the guide 10. The inner guide block is adjustable about its pivot by means of an adjusting screw 24. The location of the guide block pivots on the side of the blocks remote from the cut, permits adjustment of the wearing faces relatively to the saw in such a manner that the most effective guiding is accomplished as near as possible to the cut.

During the normal operation of the mill, the lower band wheel 3 is rotated, thereby advancing the band saw 1 and rotating the upper band wheel 2. The logs to be cut are then fed past the saw and cut into boards, which are delivered from the machine in the usual manner. If the machine is operated as a double cutting mill, a board is cut from the log during both the forward and return movement of the carriage.

If it is desired to vary the tension on the saw, it is necessary only to manually release the locking elements 47 and to adjust the position of the weight 42 relatively to the lever 39, by means of the crank 43, to such a position that the desired tension is produced. If it is desired to remove the saw 1, the weight 42 should first be shifted to such a position relative to the lever 39 that the forces on the lever 39 produced by the weight 42 and upper band wheel 2 and associated elements, will be substantially balanced. The lever 39 may then be moved in a clock-wise direction, thereby moving the worm 37, worm wheel 36 and gear 33 and causing the rack 32 to move downwardly along the rollers 35, thus turning the shaft 30 and pinions 29 in a clockwise direction, as viewed in Figs. 1 and 4. This motion of the elements causes the columns 8 and hence the upper band wheel 2 to move downwardly, thereby releasing the saw 1. The guides 10, 22 may then be opened and the saw 1 freely removed. After a saw has been inserted and in order to restore the tension in the saw, it is necessary only to reversely swing the lever 39 into horizontal position and to readjust the weight 42, in order to place the machine in condition for operation. In order to adjust the upper band wheel 2 to accommodate saws of different lengths, it is necessary to actuate the hand wheel 38 and worm 37. Upon turning the hand wheel 38 and worm 37, the position of the lever 39 is not disturbed, but the worm wheel 36 and gear 33 are rotated, causing the rack 32 to move, thereby moving the pinions 29 and columns 8. It will thus be noted that with this structure the saw tension may be quickly varied, the saw may be readily removed or inserted, and saws of varying lengths may be effectively accommodated.

If it is desired to adjust the position of the upper guide 10, it is necessary only to turn the hand wheel 17 in the proper direction. Upon turning the hand wheel in a clockwise direction as viewed in Fig. 1, the weight 15, which substantially balances the guide arm 9 and guide 10, is moved downwardly, thereby raising the guide arm 9 upon the rods 11 and hence raising the guide 10. Upon turning the hand wheel 17 in a counter-clockwise direction, the guide 10 will be moved downwardly. It will thus be noted that the guide 10 may be readily and quickly adjusted to the desired position without danger of injury to the operator. It should also be noted that if desirable, this adjusting means may readily be applied to the lower guide 22.

If it is desired to adjust the guide block 23, it is necessary only to turn the adjusting screw 24, when the block 23 will be swung about its pivot and toward the blade of the saw.

It will thus be noted that the rigid one-piece guide arm 9, together with the readily adjustable upper guide 10, produce an exceedingly rigid frame structure and effectively prevent "springing" of the saw, thereby insuring the production of boards of uniform thickness. By constructing the upper and lower wheels in two parts which are relatively adjustable, saws of different widths may be utilized in the mill and the mill may be readily converted from a single into a double cutting mill. The tension in the saw may be readily varied and the saws may be readily and quickly removed. The machine may be quickly adjusted to accommodate saws of different lengths without the cumbersome telescopic structure of the prior art. The saw guide may be quickly shifted and the guide blocks thereof readily adjusted to compensate for wear. This feature is of importance since the upper guide is the main guiding element and by having this guide act efficiently and making the same readily adjustable in proximity to the log, uniform thickness of lumber will be insured.

It will be further noted that all parts of the machine are formed and located to provide maximum accessibility and convenience and so as to subject the operator to least danger of injury. If for any reason the upper guide should be raised by the log, this guide cannot come in contact with the upper wheel 2, as the stops 48 will prevent such engagement.

It should be understood that it is not desired to be limited to the exact details of construction herein shown and described, for various modifications within the scope of the appended claims may occur to a person skilled in the art.

It is claimed and desired to secure by Letters Patent:

1. In combination, a frame, a band wheel, a band saw engaging said wheel, means for supporting said wheel, a pair of relatively movable racks associated with said frame and with said wheel supporting means respectively, a laterally movable pinion co-acting with said racks, and movable means for holding said pinion in operative relation to said racks.

2. In combination, a frame, a band wheel, a band saw engaging said wheel, movable means supporting said wheel, a pair of relatively movable racks associated with said frame and with said movable means respectively, a laterally movable pinion co-acting with said racks, and movable means for holding said pinion in operative relation to said racks, said means being movable relatively to both of said racks.

3. In combination, a frame, a band wheel, a band saw engaging said wheel, means for supporting said wheel so as to permit movement thereof relatively to said frame, racks associated with said frame and with said wheel supporting means respectively, a laterally movable pinion co-acting with said racks, a holding casing for said pinion slidable relatively to said racks, and a pair of rollers carried by said holding casing, said rollers being engageable with said racks to maintain proper engagement between said racks and said pinion.

4. In combination, a frame, a band wheel, a band saw engaging said wheel, movable means supporting said wheel, a laterally movable pinion associated with said frame and with said movable means for moving said wheel relatively to said frame, means for rotating said pinion to urge said wheel in one direction to tension said saw, and means for varying the force exerted by said urging means upon said wheel.

5. In combination, a frame having a stationary rack, a band wheel, a band saw engaging said wheel, movable supporting means for said wheel having a movable rack, a laterally movably pinion associated with said racks for moving said wheel relatively to said frame, a lever associated with said pinion for rotating the same, and a weight movable along said lever to vary the force tending to rotate said pinion.

6. In combination, a frame having a pair of spaced stationary racks, a band wheel located between said racks, a band saw engaging said wheel, a pair of movable supports for said wheel, each of said supports having a rack extending in proximity to one of said stationary racks, and a pair of laterally movable pinions associated with said movable and stationary racks for moving said wheel relatively to said frame.

7. In combination, a frame having a pair of spaced stationary parallel vertical racks, a band wheel located between said racks, a band saw engaging said wheel, vertical movable supports for said wheel located on opposite sides thereof and each having a rack extending in proximity to one of said stationary racks, and a pair of laterally movable pinions associated with said racks and movable relatively thereto to vary the tension on said saw.

8. In combination, a frame having a rack, a band wheel, a band saw engaging said wheel, movable supporting means for said wheel having a rack extending in proximity to said frame rack, a laterally movable pinion associated with said racks for moving said wheel relatively to said frame, and a combined supporting and inclosing casing associated with said pinion and slidably associated with said racks.

9. In combination, a frame having a pair of spaced racks, a band wheel located between said racks, a band saw engaging said wheel, movable supporting means for said wheel having a pair of racks located on opposite sides of said wheel, laterally movable pinions located on opposite sides of said wheel and engageable with said racks for moving said wheel relatively to said frame, and a combined supporting and inclosing casing associated with each of said pinions and slidable upon said racks.

In testimony whereof, the signature of the inventor is affixed hereto.

WILLIAM HENRY TROUT.